United States Patent
Walsh et al.

(10) Patent No.: US 11,019,208 B2
(45) Date of Patent: May 25, 2021

(54) DETECTING USER HESISTANCY FROM TEXT INPUT

(71) Applicant: Avaya Inc., Santa Clara, CA (US)

(72) Inventors: Adrian Walsh, Galway (IE); Warren Reilly, Galway (IE); Niall Fallon, Galway (IE); Brian Cunningham, Galway (IE); Donal Tarpey, Galway (IE)

(73) Assignee: Avaya Inc., Santa Clara, CA (US)

( * ) Notice: Subject to any disclaimer, the term of this patent is extended or adjusted under 35 U.S.C. 154(b) by 24 days.

(21) Appl. No.: 16/426,213

(22) Filed: May 30, 2019

(65) Prior Publication Data

US 2020/0382640 A1 Dec. 3, 2020

(51) Int. Cl.
*H04M 3/51* (2006.01)
*H04M 3/56* (2006.01)

(52) U.S. Cl.
CPC ....... *H04M 3/5175* (2013.01); *H04M 3/5183* (2013.01); *H04M 3/56* (2013.01)

(58) Field of Classification Search
CPC ..... H04M 3/5175; H04M 3/56; H04M 3/5183
USPC ............ 379/265.06, 265.07, 265.08, 265.09, 379/265.05
See application file for complete search history.

(56) References Cited

U.S. PATENT DOCUMENTS

| | | | |
|---|---|---|---|
| 7,783,027 B2 | 8/2010 | Shinpuku et al. | |
| 8,634,543 B2 | 1/2014 | Flockhart et al. | |
| 9,419,868 B1* | 8/2016 | Koerner | G06Q 10/0633 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2015/0281454 A1* | 10/2015 | Milstein | G06Q 10/063112 379/265.12 |

* cited by examiner

*Primary Examiner* — Thjuan K Addy
(74) *Attorney, Agent, or Firm* — Sheridan Ross P.C.

(57) ABSTRACT

Agents of a contact center may utilize a text channel (e.g., text chat, email, etc.) to communicate with a customer. A processor monitors the keystrokes entered by the agent. If the agent is found to have entered keystrokes beyond a previously determined threshold, and subsequently deleted the resulting test and replaced it with another test, a deficiency may be determined to be present. When a deficiency is present, the processor may initiate a remediation action.

20 Claims, 6 Drawing Sheets

DETECTING USER HESISTANCY FROM TEXT INPUT

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for monitoring communications and particularly to monitoring textual inputs for subsequent action.

SUMMARY

Like all businesses, contact centers strive to be as efficient as possible. Improvements in computing and communication resources can be limited if the human element hinders such improvements. Contact centers utilize many metrics in an attempt to determine how well agents are handling work items. Sometimes the agents will figure out how to game the system based on what is being measured, which may conceal a weakness or incompetency. The prior art fails to measure or consider hesitancy statistics to determine if a contact center agent needs more training or if a particular communication or communication type should be rerouted to an alternative resource.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems are provided to detect a hesitancy of the agent that may indicate that the agent needs more training. In particular, the typing patterns of an agent may be monitored and analyzed to identify issues and respond accordingly. For example, the hesitancy may be determined by the repeated deletion of characters already entered or in a chat interaction a customer where the customer can only observe a state of the agent, such as 'is typing.' The time spent typing may not correspond to the response actually sent, which may have relatively few characters for the time given 'is typing.' For example, the hesitancy may be based on an overall time to make a summary, to respond to an email, to respond to a text message, to respond to a chat, to respond to an individual question, and/or the like. The hesitancy may be based on a time between words, sentences, paragraphs, questions, and/or the like. In addition, the hesitancy may be based on time between different thoughts in a response. For example, if the customer has multiple questions, the time taken to write one response may receive a different score than a time respond to a second question (e.g., based on the complexity). This time may be based on other agent's scores/times.

On the customer side, customer hesitancy detection can cause content to be pushed to the customer, providing an interrupt to offer assistance, provide more clear input due to language issues causing customer hesitancy or an alert to a supervisor to intervene in the interaction with the customer. If the customer takes a long time (or has a lengthy response), this may also trigger training events.

The system may implement an artificial intelligence (AT) system to dynamically change scores over time. Detection may be based on hard coded rules, such as using backspace after input, i.e., typing a certain number of letters, lack of feedback to a customer, and/or the like. For example, when a question is first asked by a customer, the score may allow for a longer time because other agents are taking longer. After a time, the time may be less as more agents become familiar with the issue.

If the score exceeds a threshold, a rerouting, forking to include another resource, or training event may be triggered, such as, a system or supervisor may be alerted, the agent may be automatically added to a training session, and a calendar event may be placed in a calendar of the agent (the last two may be based on supervisor approval). The tagged event may be grouped with other agent events to determine that there are enough agents that need training to actually schedule a training class. In other words, the scheduling may not occur until multiple agents need training.

The analysis of hesitancy can be carried out in real time and where the score exceeds a threshold, the supervisor can be alerted to take action in real time, such as observing the interaction, entering a conference with the agent etc.

After action has been taken based on the hesitancy score, agents can be given the opportunity to provide feedback to the system on whether the hesitancy score was accurate or not in order to improve the learning model.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware an embodiment that is entirely software (including firmware, resident software, micro-code, etc. or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
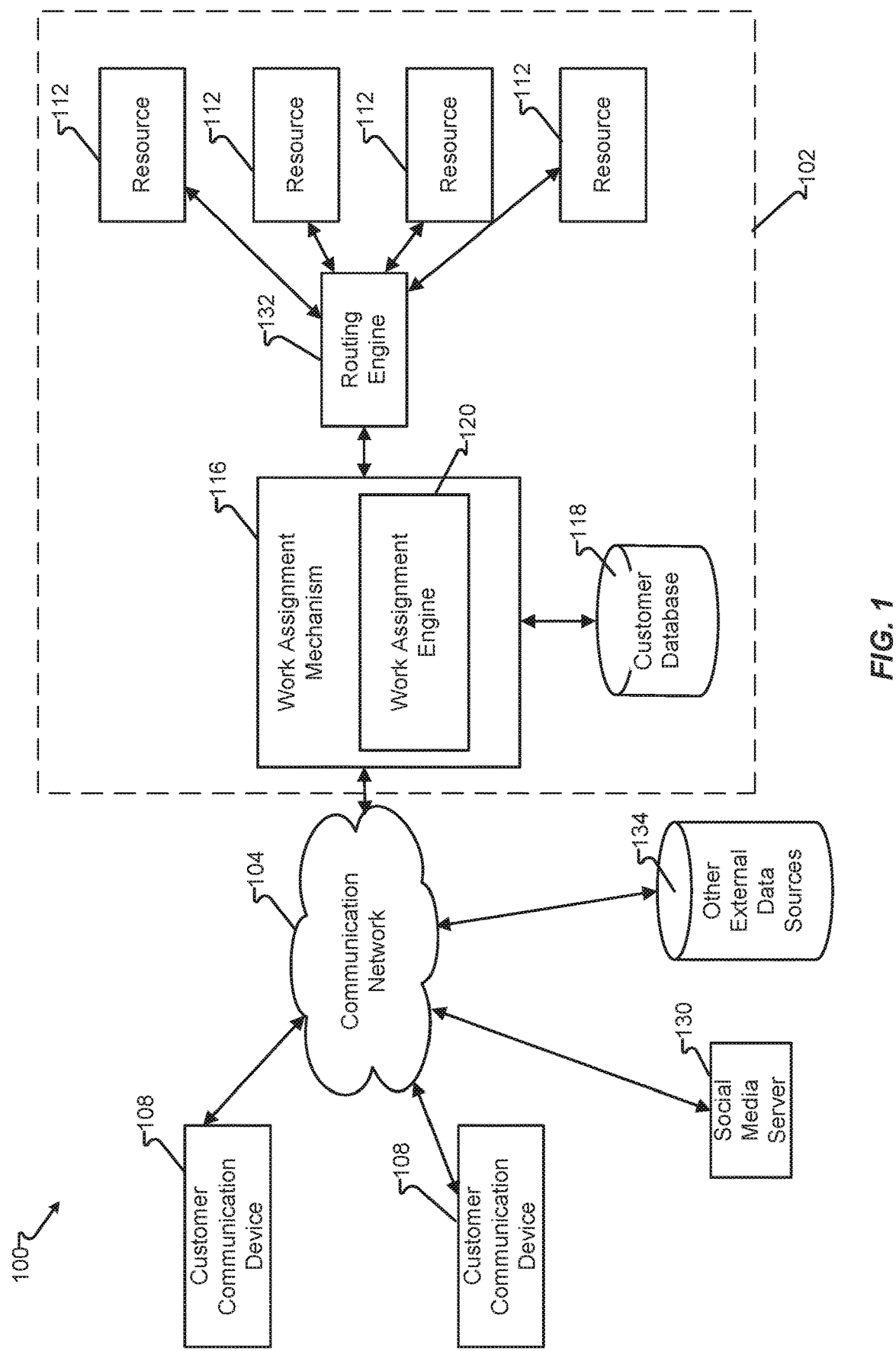
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may he provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17. 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
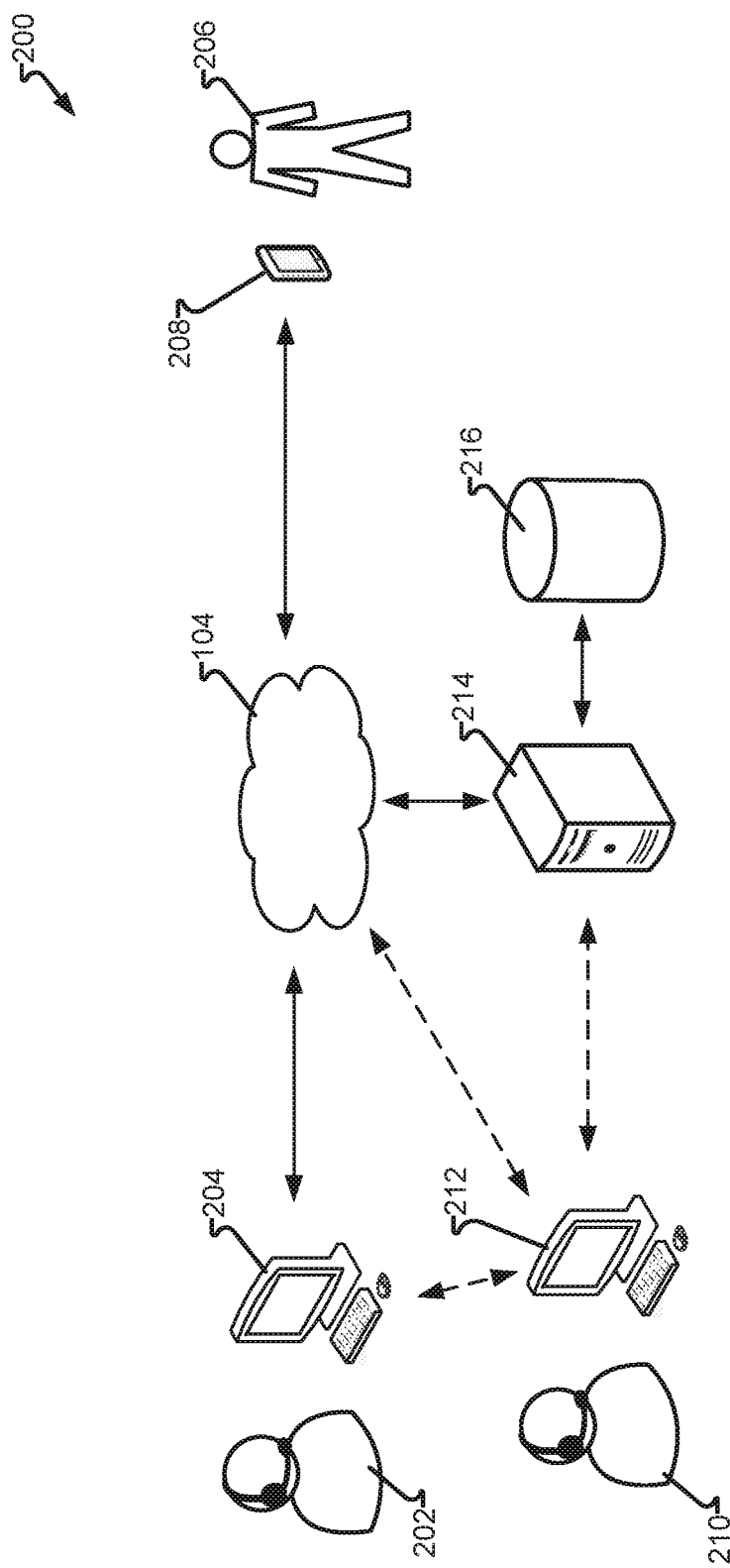
FIG. 2 depicts a second system in accordance with embodiments of the present disclosure.

FIG. 2 depicts system 200 in accordance with embodiments of the present disclosure. In one embodiment, monitored agent 202 is an embodiment of third node 212 when embodied as a human agent utilizing node 204 as an agent communication device. Monitored agent 202 may be presently engaged in a communication with customer 206 via node 204 communicating with node 208 over network 104. The communication may comprise, in part or in total, textual content (e.g., text chat, email, text comments to non-text). In another embodiment, monitored agent 202 may enter text into node 204 (e.g., via keyboard, speech-to-text application, etc.). The text entered to node 204 may then be monitored by a processor, such as a processor of server 214 receiving text via network 104. The processor of server 214 may be located within node 204, such as a separate processing thread of a shared or dedicated processor. Additionally or alternatively, server 214 is show connected to node 204 via network 104, however other network topologies may be utilized without departing from the embodiments herein. For example, server 214, or at least one processor of server 214, may be embodied as directly connected to node 204, connected via a subnetwork, hardware component, and/or other component whereby the contents of inputs of node 204 may be captured for subsequent processing, such as by receiving keystrokes as they are entered, contents of a keyboard buffer of a processor, and/or other hardware or software. As a result keystrokes entered to node 204 may be processed in real-time and/or stored for later processing. It should be appreciated that later processing may be minor delay, such as the time for a certain number of keystrokes. For example, every hundred keystrokes may be sent to server 214 or other processor for analysis.

In another embodiment, the content of messages comprising the communication between node 204 and node 208 may be analyzed by a processor. For example, server 214 may determine that a substantial number of keystrokes have be input into node 204 for the purpose of communicating with node 208 but the length of the message comprises a significantly fewer number of characters. Keystrokes not associated with a communication may be ignored. For example, monitored agent 202 may be entering text for another purpose (e.g., post-call notes, reports, etc.). However, node 204 may be executing a communication application wherein text is provided by monitored agent 202 and sent to customer 206 via node 204 and node 208 over network 104. The text entered in the communication application may be edited. Certain communication systems and applications may present a status of one node to the other.

For example, if monitored agent 202 is typing input into node 204, node 208 may present a status of "agent is typing."

Monitored agent 202 may be struggling with a particular message forming a portion of a communication with customer 206. As a result, monitored agent 202 may type a significant amount of text only to delete all, or a significant portion of what was typed. This may be the result of an absent or deficient skill, such as when monitored agent 202 attempts to provide a complete response but reconsiders and deletes a significant portion. A significant portion may be content that comprises particular keywords associated with the communication. For example, if customer 206 was asking how to modify an insurance policy then words or phrases associated with the domain of insurance (e.g., coverage, deductible, term, limits, exclusions, rider, etc.) may be deleted and, as the words are with the domain of insurance, deemed to be significant. In contrast, monitored agent 202 may have attempted to make "small talk" with customer 206 and reconsidered. For example, monitored agent 202 may have typed a message regarding a family member of monitored agent 202 who lives in the same town as customer 206, only to reconsider and delete such content. As the words deleted were generic, and not within the domain of insurance, the deletion may not be a significant deletion.

In another embodiment, the volume of the message may be deleted and considered to be a significant deletion. For example, a message may comprise several dozen or hundreds of characters, such as a set of instructions, but after being entered the text was deleted the message sent to customer 206 was much shorter (e.g., "I need to check something," "try turning it off and on again," "yes," "no," etc.). What is and is not a significant deletion is described more fully with respect to embodiments that follow. However, server 214 may utilize database 216 as a data repository of criteria, rules, thresholds, and/or other data elements utilized to compare text and/or messages against records maintained by database 216 to determine if a deficiency is present and trigger a remediation.

Following a determination, by a processor of server 214, a remediation action may be taken. Examples of remediation actions include engaging second agent 210 via third node 212 to participate in the communication between monitored agent 202 and customer 206. For example, second agent 210 may be a subject matter expert, supervisor, or other personnel that may have skills absent or deficient in monitored agent 202, such as foreign language skills, problem solving skills, difficult customer skills, domain skills, etc. While the communication with second agent 210 may be full-duplex between each of monitored agent 202, customer 206, and second agent 210, the communication may be a "whisper" communication whereby only monitored agent 202 receives communications from second agent 210, even though all communications are received by second agent 210.

A remediation may comprise altering the communication topology, which initially is limited to node 204 and node 208, such as to include third node 212. In a further embodiment, node 204 may be removed from the communication. The communication may be moved to a different channel (e.g., telephone) and/or nodes operable to communicate via the different channel.

Figure 3:
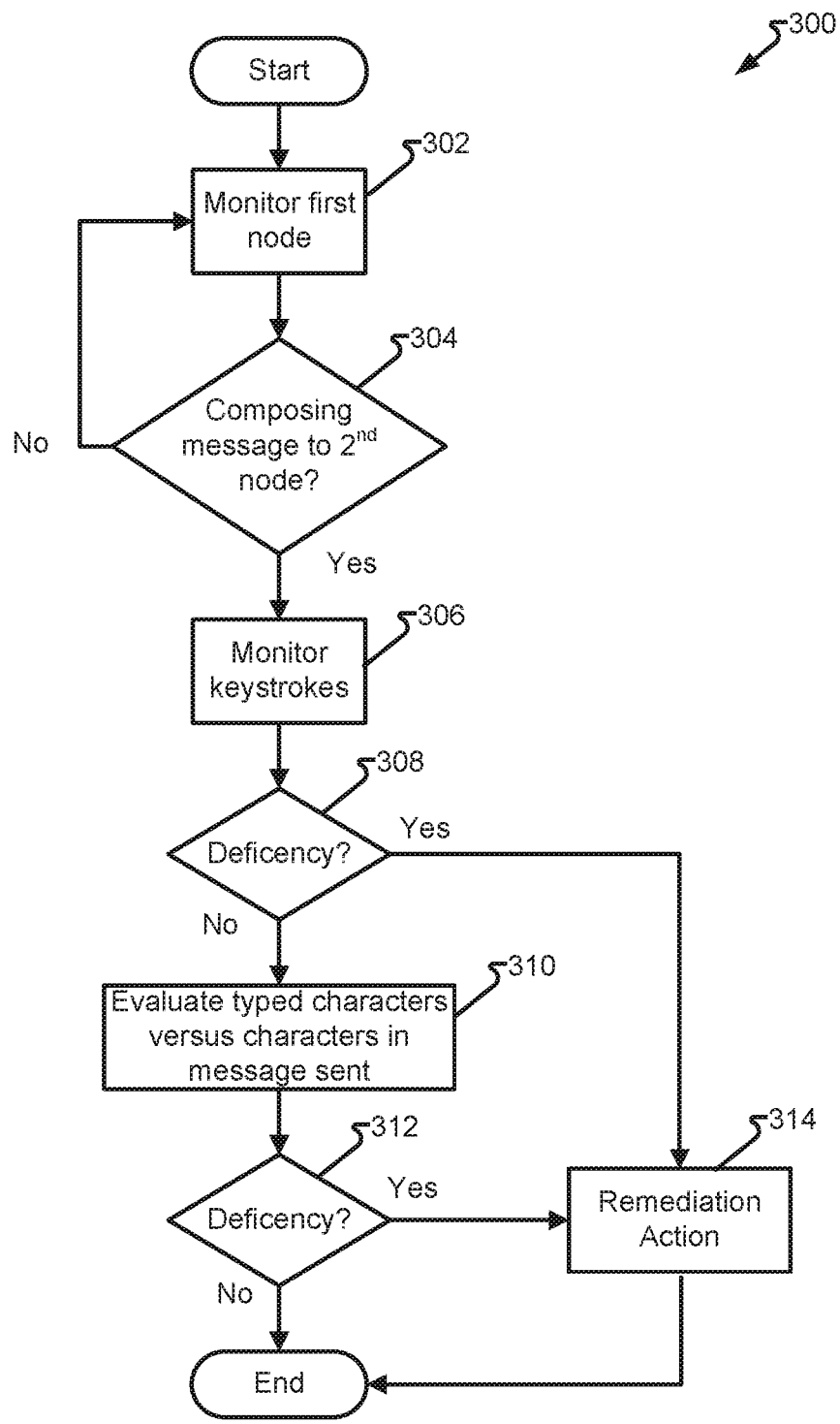
FIG. 3 depicts a first process in accordance with embodiments of the present disclosure.

FIG. 3 depicts process 300 in accordance with embodiments of the present disclosure. In one embodiment, process 300 is performed by computer-readable instructions being executed by a processor, such as a processor of server 214, node 204, third node 212, and/or other component or combination thereof. Process 300 begins and step 302 monitors a first node, such as node 204. Test 304 determines if text input to the node is associated with composing a message to a second node, such as node 208. If test 304 is determined in the negative, processing may loop back to step 302. If test 304 is determined in the affirmative, process 300 continues.

Next, step 306 monitors keystrokes input into the node. Step 306 monitors keystrokes key-by-key, which may be in real-time, or in batches, such as when a set number of keystrokes are entered, the keystrokes buffered conclude with a "send" command of a message comprising the keystrokes, upon filling a keyboard buffer, etc. In one embodiment, test 308 and test 312 are combined. In another embodiment, test 308 determines if a deficiency is discovered by keystroke analysis, such as text being input and subsequently deleted. If test 308 is determined in the affirmative, remedial action 314 performs a remedial action. If test 308 is determined in the negative, test 310 evaluates the keystrokes with the message sent. For example, a substantial number of keystrokes may have been entered and deleted from the message actually sent. Test 312 determines if a deficiency is present. For example, if several hundred keystrokes were entered but the message sent was short (e.g., "Let me check something."), then a deficiency may be present. Accordingly, if test 312 is determined in the affirmative, remedial action 314 may be executed, otherwise, process 300 may terminate or restart back at step 302. Additionally or alternatively, remedial action 314 may automatically provide training content to the agent associated with the deficiency and/or subject matter of the messages comprising the keystrokes, schedule the agent for training, notify human resource personnel, and/or other action associated with remediating a lack of skill or knowledge of the subject matter.

Figure 4:
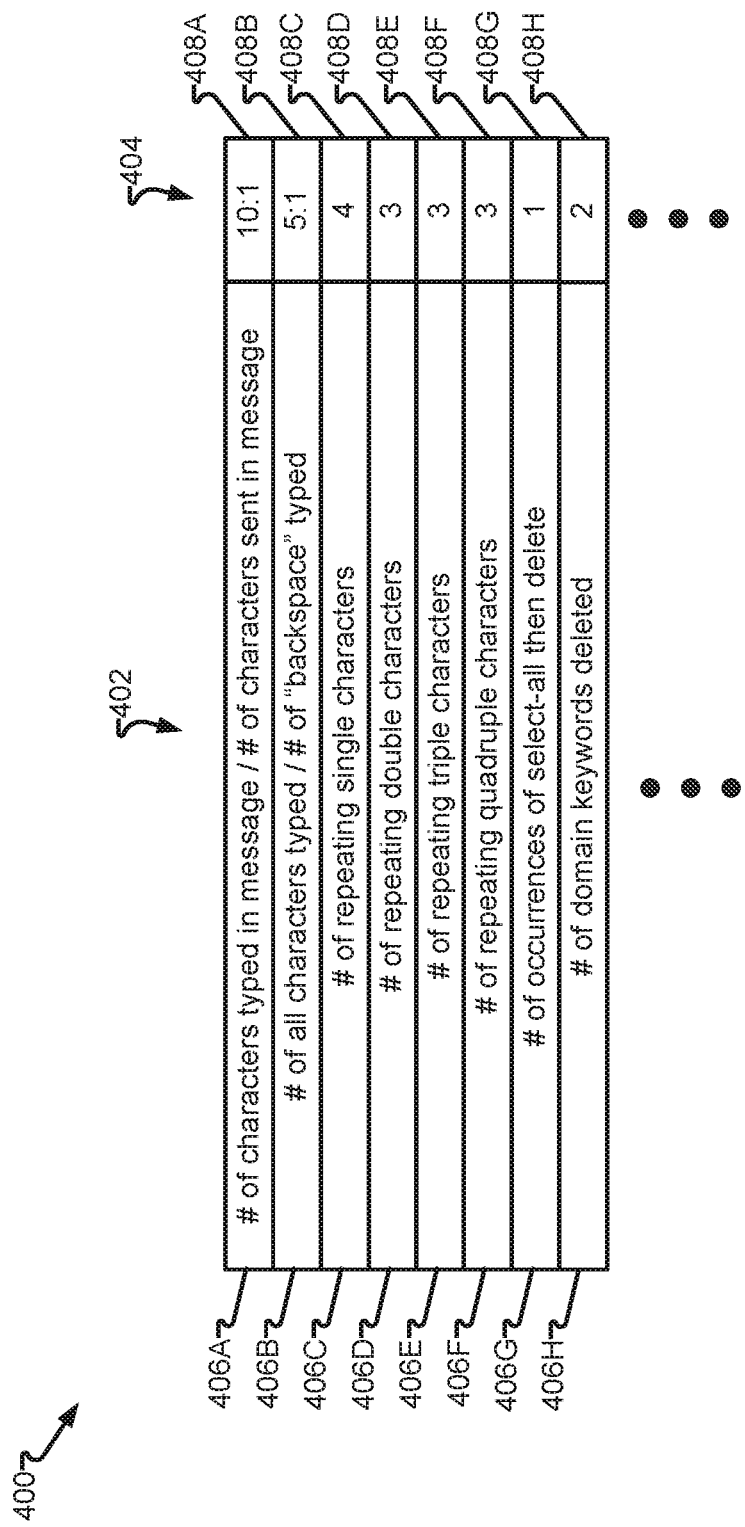
FIG. 4 depicts a data structure in accordance with embodiments of the present disclosure.

FIG. 4 depicts data structure 400 in accordance with embodiments of the present disclosure. In one embodiment, a processor, such as one executing on server 214, determines if a deficiency is present by comparing keystrokes entered with a criterion. Data structure 400 may be maintained in a data repository, such as computer memory or storage, such as database 216, to provide criterion 402 that may be compared to keystrokes entered and any associated threshold 404 that may have been satisfied to determine a deficiency is present.

The creation of data structure 400, and the subsequent maintenance thereof, may be manual, entirely automated without human intervention, or a combination thereof. For example, an automated system may identify patterns of keystrokes and subsequent success, or failure, of a particular communication. As a result, common patterns associated with a failure may be attributed to a skill-gap with the particular agent that provided the keystrokes that form the pattern and, as a result, be entered (or updated) into data structure 400.

Records of data structure 400 may comprise criteria 402, threshold 404, and optionally other data (e.g., date of entry, last update, version, number of times executed, etc.), Examples include criteria 406A-H and corresponding thresholds 408A-H. Criterion 406A defines a ration of the number of characters typed to the number of characters sent in the message and if greater than ten-to-one, a deficiency is determined to be present. Criterion 406B is a ratio of characters typed to the number of the characters that include "backspace" (and/or "delete"), such as five-to-one.

Agents may be evaluated based on customer feedback, such as customer 206 providing feedback on their experience with monitored agent 202 following the communication therebetween. Customers may be more favorable, or less unfavorable, if they have the perception that they are receiving the agent's attention and not being ignored. Perception may be based on a customer is provided with a status indicating they are working the customer's issue, such as seeing a status such as, "agent typing." Agents may be tempted to game the system, such as by typing and deleting text. The text entered may be gibberish, such as repeating single characters, (e.g., "xxxxxxxxxxxx"), double characters (e.g., "dfdfdfdfdfdr"), triple characters (e.g., "sdfsdfsdfsdf", quadruple characters (e.g., "asdfasdfasdf"), etc. As a result, the customer may be presented with an "agent typing" status even though the agent is not presently working to resolve the issue. The gibberish characters may then be deleted and replaced with other text. As a result the agent may appear to the customer, and other performance monitoring systems, to be diligently striving to resolve the work item. Criterion 406C, 406D, 406E, and 406F define the occurrence of repeated characters and their associated thresholds in 408C, 408D, 408E, and 408F, respectively.

Agents may be deficient in a particular skill as determined by a lack of confidence with a particular subject. Criterion 406G determines the number of select-all and delete operations, whereby the agent enters a message to the customer, but deletes it and responds with other text. If this occurs above threshold 408G, a deficiency may be determined. Similarly, domain keywords may be entered and deleted as determined by criterion 406H and, if over threshold. 408H, a deficiency determined to be present.

Figure 5:
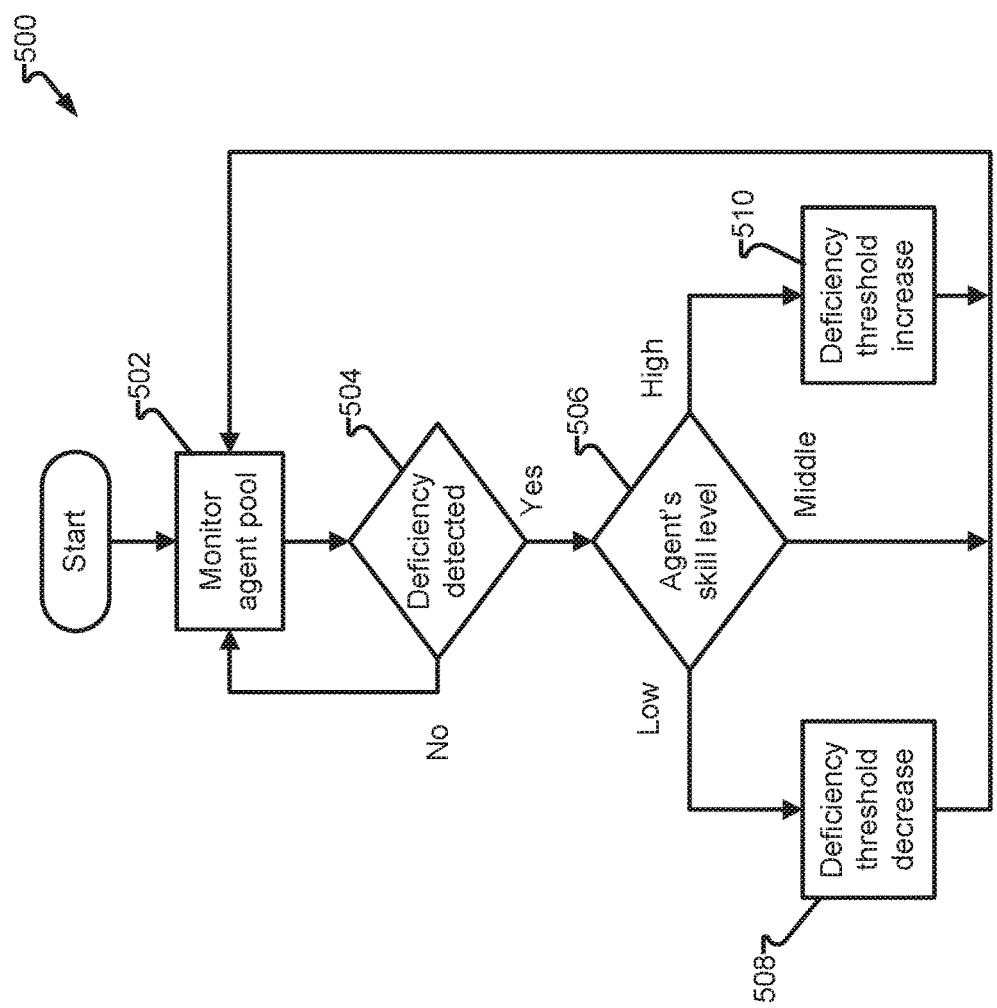
FIG. 5 depicts a second process in accordance with embodiments of the present disclosure.

FIG. 5 depicts process 500 in accordance with embodiments of the present disclosure. In one embodiment, manual creation and revisioning of the criteria utilized to determine a deficiency, such as data structure 400, is provided. In another embodiment, automatic entry and optionally revisioning may be provided which is absent human iteration. In one embodiment, process 500 begins with step 502 monitoring a pool of agents and their keystrokes and/or messages sent. Step 502 may be performed in real-time, near real-time (e.g., periodic evaluation of buffered keystrokes), and/or utilizing historic data (e.g., stored keystrokes and messages).

Test 504 determines if a deficiency is present. Test 504 utilizes keystrokes and/or messages sent in conjunction with at least one other criteria, such as customer feedback, supervisory monitoring, or agent self-reporting. If test 504 determines no defect is present, processing may loop back to step 502. If test 504 determines that a defect is present, test 506 may categorize the agent on a known skill level, such as education or a previously demonstrated expertise on a subject, language, technology, etc. If test 506 determines the defect, found in test 504, was associated with a low skill agent, step 508 may decrease the threshold of the deficiency. For example, if an agent within the domain of air freight, typed the word "manifest" or other word within a previously identified domain of air freight, and subsequently deleted it and the result was negative (as determined in test 504), and the particular agent was new (e.g., test 506 was determined as "Low"), then the threshold may be decreased in step 508, such that a subsequent occurrence of an agent typing and deleting "manifest" may trigger a remediation action. If test 506 determined the agent was highly skilled, then a defect may not be present and the number of occurrences increased in step 510. If test 506 determines that the agent has an intermediate skill level, or at least not determined to be "low" and not determined to be "high", then the result may be inconclusive and the threshold not modified.

Figure 6:
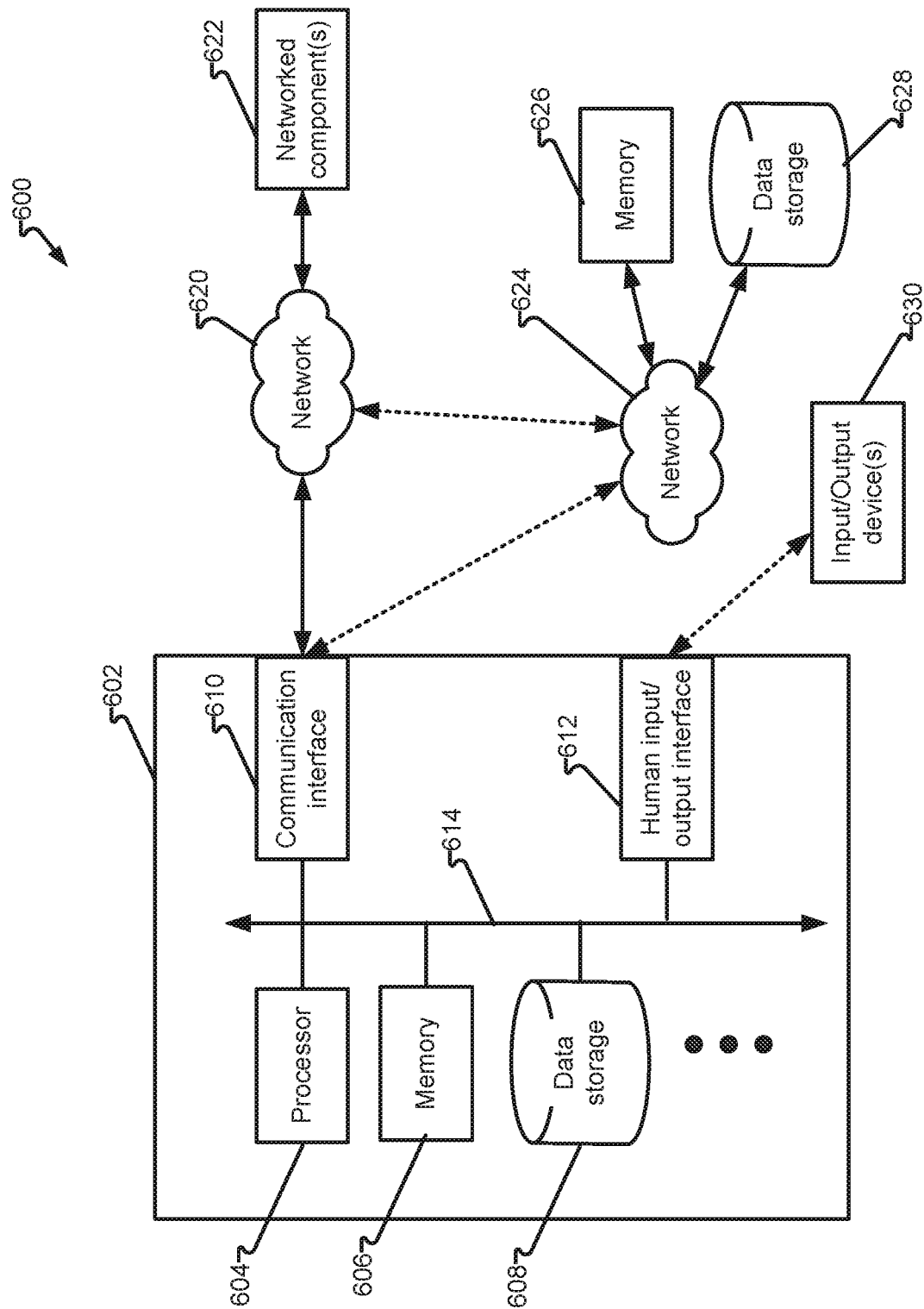
FIG. 6 depicts a third system in accordance with embodiments of the present disclosure.

FIG. 6 depicts device 602 in system 600 in accordance with embodiments of the present disclosure. In one embodiment, node 204, server 214, and/or third node 212 may be embodied, in whole or in part, as device 602 comprising various components and connections to other components and/or systems. The components are variously embodied and may comprise processor 604. Processor 604 may be embodied as a single electronic microprocessor or multi-processor device (e.g., multicore) having therein components such as control unit(s), input/output unit(s), arithmetic logic unit(s), register(s), primary memory, and/or other components that access information (e.g., data, instructions, etc), such as received via bus 614, executes instructions, and outputs data, again such as via bus 614.

In addition to the components of processor 604, device 602 may utilize memory 606 and/or data storage 606 for the storage of accessible data, such as instructions, values, etc. Communication interface 610 facilitates communication with components, such as processor 604 via bus 614 with components not accessible via bus 614. Additionally or alternatively, input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, input/output interface 612. Communication interface 610 may be configured to communicate directly with a networked component or utilize one or more networks, such as network 620 and/or network 624.

Network 104 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622.

Additionally or alternatively, one or more other networks may be utilized. For example, network 624 may represent a second network, which may facilitate communication with components utilized by device 602. For example, network 624 may be an internal network to contact center 102 whereby components are trusted (or at least more so) that networked components 622, which may be connected to network 620 comprising a public network (e.g., Internet) that may not be as trusted. Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via input/output interface 612 and/or via communication interface 610 either directly, via network 624, via network 620 alone (not shown), or via networks 624 and 620.

It should be appreciated that computer readable data may be sent, received, stored, processed, and presented by a variety of components. It should also be appreciated that components illustrated may control other components, whether illustrated herein or otherwise, For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular customer, using a particular customer communication device 108, may be enabled (or disabled) with a particular resource 112. Similarly, one particular resource 112 may be enabled (or disabled) from communicating with a particular other resource 112. Ones of ordinary skill in the art will appreciate that other communication equipment may be utilized, in addition or as an alternative, to those described herein without departing from the scope of the embodiments.

Embodiments of the above system include: a computer having a processor and memory; a communication interface connecting the computer to a network; and wherein the processor monitors inputs to a first node on the network, while the first node is engaged in a communication with a second node on the network; and wherein the processor evaluates keystrokes of the inputs against a deficiency criterion and, upon determining a number of the keystrokes matches the deficiency criterion, the processor initiates a remediation.

Aspects the foregoing system include: wherein the remediation comprises forking the communication to include a third node;

Aspects the foregoing system include: wherein the remediation further comprises disconnecting the first node from the communication.

Aspects the foregoing system include: wherein the deficiency criterion comprises a previously determined ratio of the number of keystrokes input to compose a message to be sent to the second node to the number of characters in the message actually sent to the second node.

Aspects the foregoing system include: wherein the deficiency criterion comprises a previously determined ratio of backspaces within the number of keystrokes.

Aspects the foregoing system include: wherein the deficiency criterion comprises the keystrokes associated with a number of repeating characters occurring without interruption.

Aspects the foregoing system include: wherein the deficiency criterion comprises the keystrokes associated with a number of repeating characters occurring without interruption.

Aspects the foregoing system further comprise: a keystroke splitter; a communication component; and a monitoring component; and wherein the first node provides each keystroke of the keystrokes of the input to the communication component, the communication component utilized in the communication with the second node, and the monitoring component Embodiments of the above method include: receiving keystrokes of on a first node; providing the keystrokes as inputs to a communication with a second node; providing the keystrokes as inputs to a monitoring component; determining, by the monitoring component, whether the keystrokes match a deficiency criterion; and upon determining the keystrokes match the deficiency criterion, initiating a remediation.

Aspects of the foregoing method include: wherein the remediation comprises forking the communication to include a third node.

Aspects of the foregoing method include: wherein the remediation further comprises disconnecting the first node from the communication.

Aspects of the foregoing method include: wherein the deficiency criterion comprises a previously determined ratio of the number of keystrokes input to compose a message to be sent to the second node to the number of characters in the message actually sent to the second node.

Aspects of the foregoing method include: wherein the deficiency criterion comprises a previously determined ratio of backspaces within the number of keystrokes.

Aspects of the foregoing method include: wherein the deficiency criterion comprises the keystrokes associated with a number of repeating characters occurring without interruption.

Aspects of the foregoing method include: wherein the deficiency criterion comprises the keystrokes associated with a number of repeating characters occurring without interruption.

Embodiments of the above system include: means to a first node and a second node to communicate; means to monitors keystrokes input to the first node while the first node is engaged in a communication with the second node; and means to determine whether the keystrokes match a deficiency criterion; and upon determining the keystrokes matches the deficiency criterion, means to remediate the deficiency.

Aspects of the foregoing system include: wherein the remediation comprises means to fork the communication to include a third node.

Aspects of the foregoing system include: wherein the remediation comprises means to disconnect the first node from the communication.

Aspects of the foregoing system include: wherein the deficiency criterion comprises a previously determined ratio of the number of keystrokes input to compose a message of the communication to be sent to the second node to the number of characters in the message actually sent to the second node.

Aspects of the foregoing system include: wherein the deficiency criterion comprises a previously determined ratio of backspaces within the keystrokes.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/hon-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications devices) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an apples, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a computer having a processor and a memory;
   a communication interface connecting the computer to a network; and
   wherein the processor monitors inputs to a first node on the network, while the first node is engaged in a communication with a second node on the network; and
   wherein the processor evaluates keystrokes of the inputs against a deficiency criterion and, upon determining that a number of the keystrokes matches the deficiency criterion, the processor initiates a remediation.

2. The system of claim 1, wherein the remediation comprises forking the communication to include a third node.

3. The system of claim 1, wherein the remediation further comprises disconnecting the first node from the communication.

4. The system of claim 1, wherein the deficiency criterion comprises a previously determined ratio of a number of keystrokes input to compose a message to be sent to the second node to a number of characters in the message actually sent to the second node.

5. The system of claim 1, wherein the deficiency criterion comprises a previously determined ratio of backspaces within a number of keystrokes.

6. The system of claim 1, wherein the deficiency criterion comprises the keystrokes associated with a number of repeating characters occurring without interruption.

7. The system of claim 1, wherein the deficiency criterion comprises the keystrokes associated with a number of repeating plurality of characters occurring without interruption.

8. The system of claim 1, further comprising:
   a keystroke splitter;
   a communication component; and
   a monitoring component; and
   wherein the first node provides each keystroke of the keystrokes of an input to the communication component, the communication component utilized in the communication with the second node, and the monitoring component.

9. A method, comprising:
   receiving keystrokes from a first node;
   providing the keystrokes as inputs to a communication with a second node;
   providing the keystrokes as inputs to a monitoring component;
   determining, by the monitoring component, whether the keystrokes match a deficiency criterion; and
   upon determining that the keystrokes match the deficiency criterion, initiating a remediation.

10. The method of claim 9, wherein the remediation comprises forking the communication to include a third node.

11. The method of claim 9, wherein the remediation further comprises disconnecting the first node from the communication.

12. The method of claim 9, wherein the deficiency criterion comprises a previously determined ratio of a number of keystrokes input to compose a message to be sent to the second node to a number of characters in the message actually sent to the second node.

13. The method of claim 9, wherein the deficiency criterion comprises a previously determined ratio of backspaces within a number of keystrokes.

14. The method of claim 9, wherein the deficiency criterion comprises the keystrokes associated with a number of repeating characters occurring without interruption.

15. The method of claim 9, wherein the deficiency criterion comprises the keystrokes associated with a number of repeating plurality of characters occurring without interruption.

16. A system, comprising:
   means to enable a first node and a second node to communicate:
   means to monitor keystrokes input to the first node while the first node is engaged in a communication with the second node; and
   means to determine whether the monitored keystrokes match a deficiency criterion; and
   upon determining that the monitored keystrokes match the deficiency criterion, means to remediate a deficiency associated with the deficiency criterion.

17. The system of claim 16, wherein the remediation comprises means to fork the communication to include a third node.

18. The system of claim 16, wherein that comprises means to disconnect the first node from the communication.

19. The system of claim 16, wherein the deficiency criterion comprises a previously determined ratio of a number of keystrokes input to compose a message of the communication to be sent to the second node to a number of characters in the message actually sent to the second node.

20. The system of claim 16, wherein the deficiency criterion comprises a previously determined ratio of backspaces within the monitored keystrokes.

* * * * *